INVENTOR.
ERWIN W. GRAHAM
BY
Bosworth, Sessions, Herrnston & Willis
ATTYS.

July 3, 1956

E. W. GRAHAM 2,752,687

AUTOMATIC GAGING APPARATUS

Filed May 11, 1953

INVENTOR.
BY ERWIN W. GRAHAM
Bosworth, Sessions, Herrstrom & Williams
ATTYS.

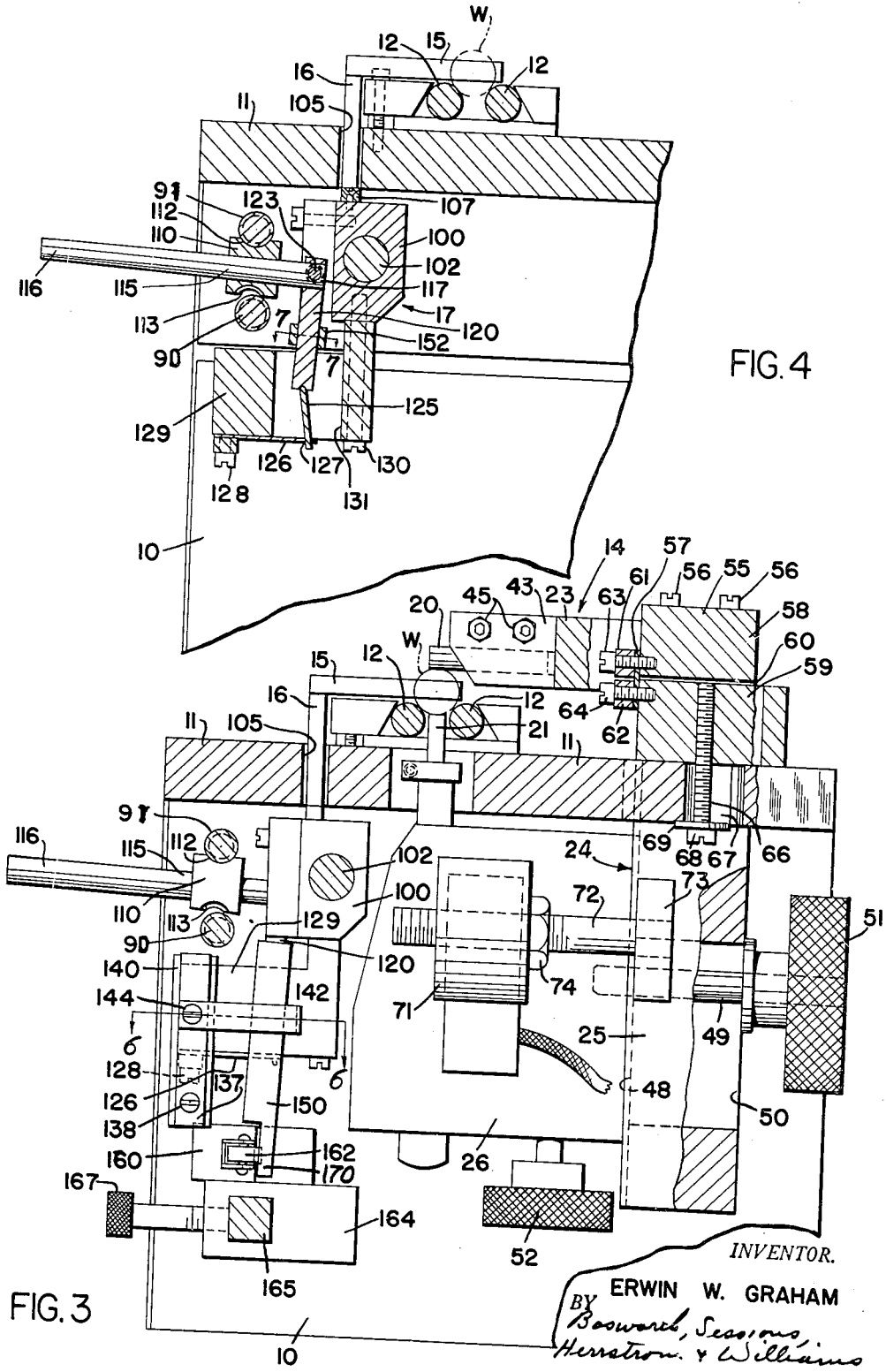

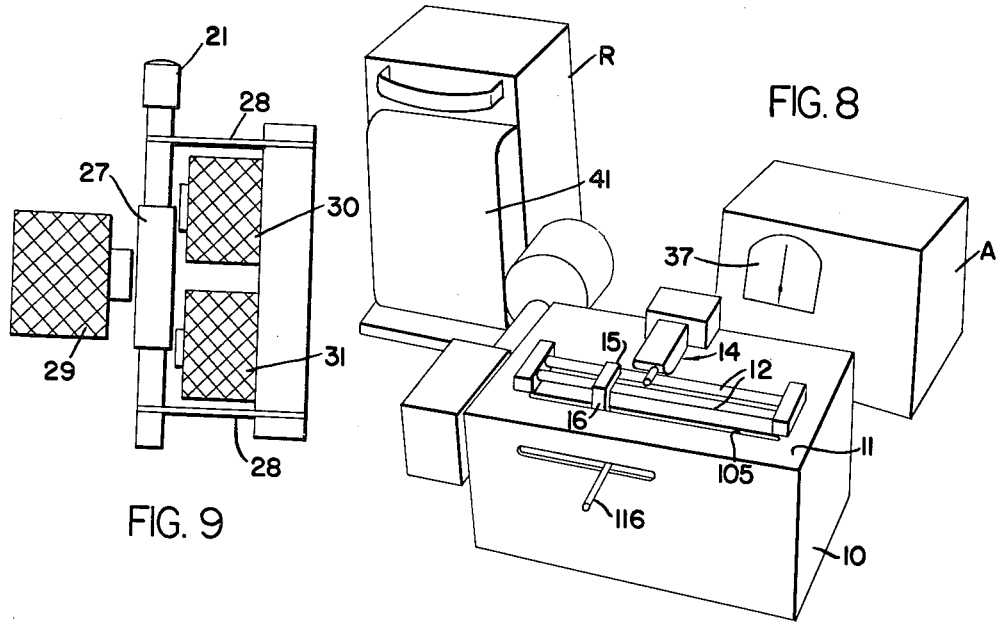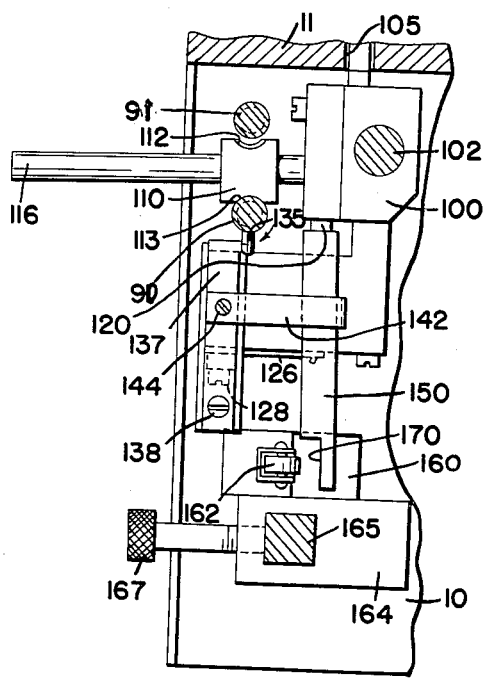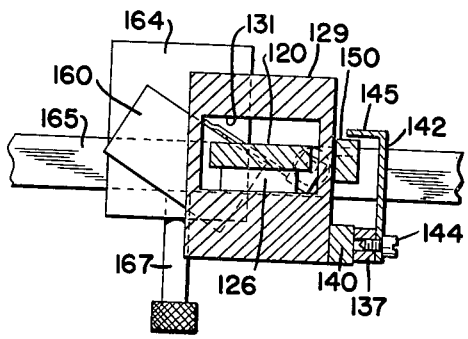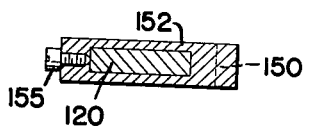

July 3, 1956

E. W. GRAHAM 2,752,687

AUTOMATIC GAGING APPARATUS

Filed May 11, 1953

*INVENTOR.*
ERWIN W. GRAHAM
BY
*Williams & Tilbury*
ATTORNEYS

United States Patent Office 2,752,687
Patented July 3, 1956

2,752,687

AUTOMATIC GAGING APPARATUS

Erwin W. Graham, Parma Heights, Ohio, assignor to Cleveland Instrument Company, Cleveland, Ohio, a corporation of Ohio Application May 11, 1953, Serial No. 354,079

13 Claims. (Cl. 33—147)

This invention relates to gaging apparatus and more particularly to apparatus for making precise measurements of the dimensions of workpieces as they are moved through the apparatus and engaged by the measuring head. The apparatus is automatic in operation to the extent that the workpiece and gage head are moved relative to each other by suitable drive mechanism and the dimension measurements taken during such movement. The particular form of the apparatus described herein is adapted to gage and record on a chart the measurements of elongated workpieces such as piston pins, bearing pins and the like, but it is to be understood that the invention is not limited to the gaging of any particular type of work and may be adapted to the gaging of various articles.

In the manufacture of many types of articles, it is necessary that certain of their dimensions be gaged with a high degree of accuracy. Sometimes this accuracy is of sufficient importance so that a permanent record is desired. Again it frequently is desirable that the various articles of a production run can be classified by dimension into groups so a given article can be properly matched with another precisely gaged article to obtain a desired accurate fit in a subsequent assembly. Thus, for example, piston pins may be matched with their mating holes in pistons. Certain of these articles are held to such close tolerances that they may not be handled by the operator's fingers during gaging because the body heat affects the article enough to give a spurious reading.

Accordingly, a general object of the invention is the provision of an apparatus whereby objects may be gaged automatically and rapidly with a high degree of precision. A second object is to accomplish the gaging in such fashion that a permanent record of the dimensions of the gaged part may be made as the gaging operation takes place. Another object is the provision of a gaging apparatus that is particularly adapted continuously to gage workpieces along a surface as distinguished from spot checking it at various places along such surface. A further object is the provision of such an apparatus wherein an assembly including the gage head, measuring tip and the anvil can float as a unit with respect to the supports for the workpiece so that the accuracy of the gaging operation is not dependent upon the accuracy or alignment of the work supports with respect to the gage head. Another object is the provision of a simple and effective means for automatically moving a workpiece and gage head relative to each other to perform the desired gaging operation. Still a further object is the provision of a gaging apparatus in which the workpieces are gaged continuously over a surface as they are automatically progressed past a gage head and a permanent record simultaneously made of their dimensions. Other objects include the provision of such a gaging apparatus which is simple and foolproof in operation, comparatively easy to construct, and which is capable of making measurements with a high degree of precision.

Further objects and advantages of the invention will become apparent from the following description of a preferred form thereof, reference being made to the accompanying drawings in which:

Figure 3 is a transverse sectional view taken substantially as indicated by line 3—3 of Figure 2 and illustrating the floating anvil and gage head assembly;

Figure 4 is a sectional detail taken as shown by line 4—4 of Figure 2;

Figure 5 is a section illustrating the drive and reversing mechanism for the pusher that advances the work through the apparatus, the section being taken in the same plane as Figure 3 but showing the drive in reversed position from Figure 3.

Figure 6 is a sectional detail of the reversing and control mechanism as indicated by line 6—6 of Figure 3;

Figure 7 is a sectional detail taken on line 7—7 of Figure 4;

Figure 8 is a perspective showing an assembly consisting of the gage proper, amplifier and recorder;

Figure 9 is a schematic view of the construction of the gage head proper and,

Figure 1:
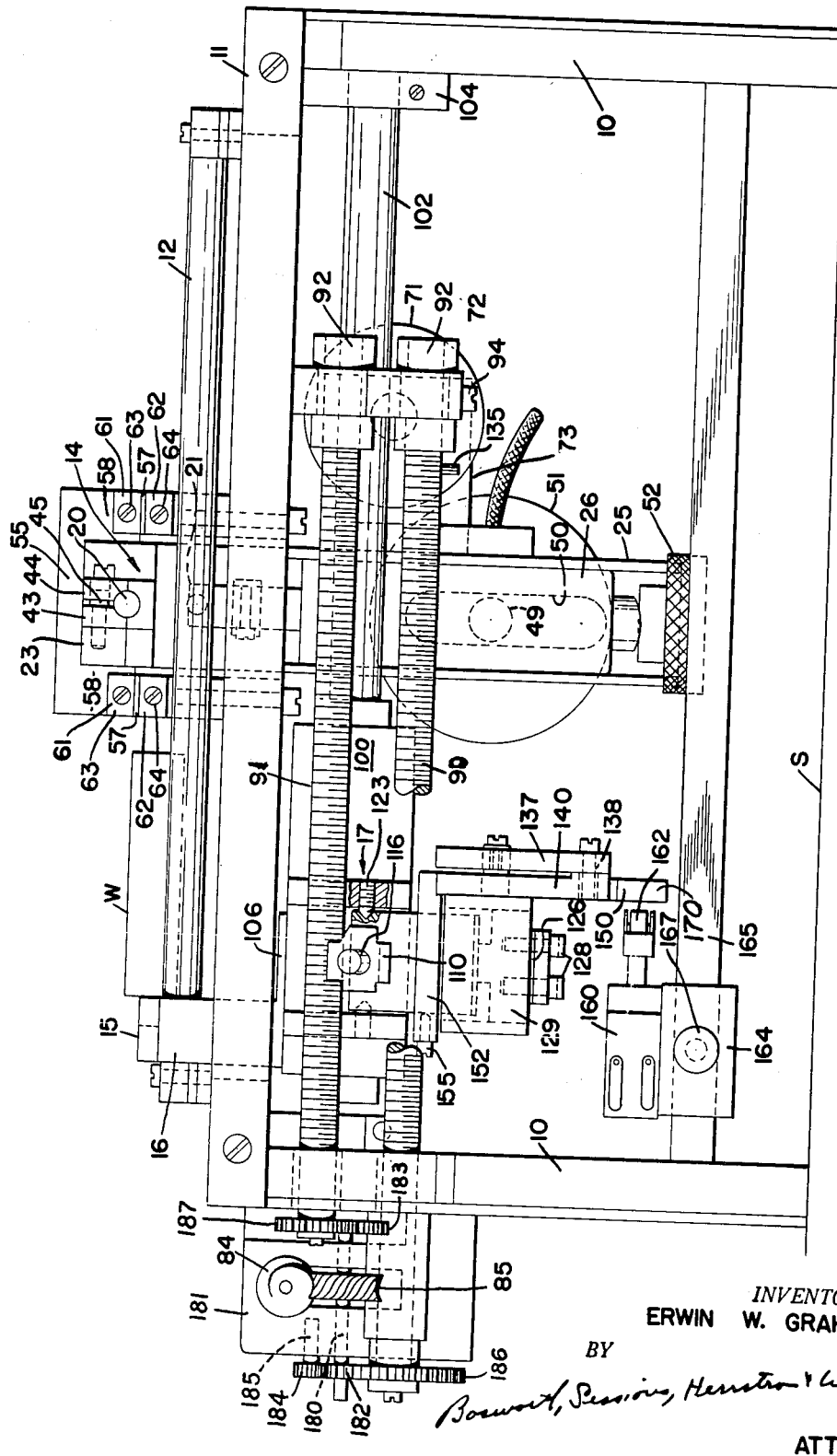
Figure 1 is a front elevation of a preferred form of gaging apparatus embodying my invention.
Figure 2:
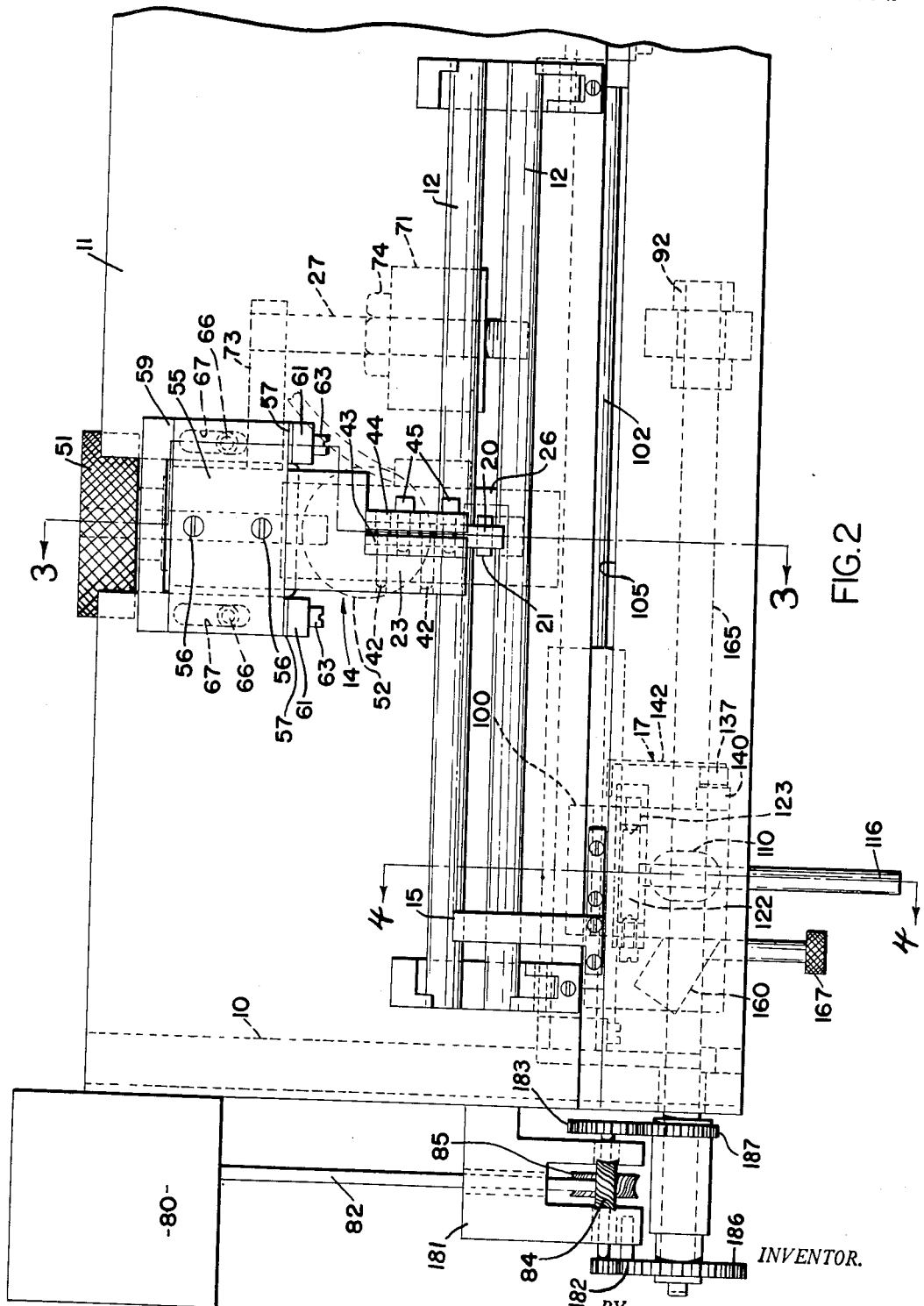
Figure 2 is a plan view of the apparatus shown in Figure 1.

Referring to Figures 1 and 2 of the drawings, an apparatus made according to the preferred form of my invention may comprise a main supporting frame made up of upright end members 10 adapted to rest upon a suitable supporting surface and carrying a flat upper plate or table 11. Mounted upon the table 11 are a pair of work supporting rails or guides 12 (see also Figure 3) which in this instance consist of parallel horizontally extending cylindrical rods that are adapted to support above and between them a workpiece such as the cylindrical workpiece W. The workpiece W is automatically moved along the rails past the gaging apparatus comprising a gage head and cooperating anvil as indicated in general at 14. This is accomplished by a pusher 15 that is connected by means of a vertical portion 16 (Fig. 4) to the driving mechanism indicated in general at 17.

This mechanism, hereafter described, advances the pusher 15, and through it the workpiece, along the rails 12 at a substantially uniform speed, the gaging operation being accomplished during such movement. It then acts automatically to stop the pusher, reverse its direction and return it at a higher speed to its starting point where it is again stopped, ready for the next gaging cycle. If desired, the pusher 15 may be in the form of a chuck, movable belt, or similar device which not only moves the workpiece through the gaging operation but at the same time holds it so that the rails 12 may be dispensed with.

In gaging operations the workpiece W to be measured generally is engaged on one side by an anvil and on the other by a measuring tip of the gage head. A cardinal feature of the present invention is the novel mounting for a gaging assembly comprising the anvil and gage head with its tip so the assembly may float independently of the support for the workpiece. Thus, as the workpiece is advanced along the rails through the gaging apparatus indicated in general at 14, it is engaged by an anvil 20 and a measuring tip 21, as shown particularly in Figures 1 and 3. The measuring tip can move toward and away from the anvil so variations in size of the workpiece are transmitted to the gage head 26. The anvil 20 faces down and engages the upper surface of the workpiece. To this end it is fixedly mounted on the upper horizontal arm 23 of an inverted L-shaped sub-frame 24, the vertical leg of which is indicated at 25.

As will appear in greater detail below, the sub-frame, including the anvil 20 and a gage head 26 carrying the measuring tip 21, is mounted for limited pivotal movement as an assembly with respect to the main frame of the apparatus in a plane normal to the line of travel of the workpiece. Thus, the anvil and measuring tip and gage head float with respect to the main frame and maintain proper gaging contact with the workpiece W during the gaging operation independently of the rest of the apparatus including the work support rails 12. The measuring tip 21, as stated above, is carried by the gage head 26 and is resiliently urged into engagement with the workpiece W. The gage head 26 may be one of several types. As an example I have shown a gage head that is electronic in principle, as distinguished, for instance, from an air gage head which might also be used with this type of support. It contains appropriate pickup or transducer mechanism, whereby the movements of the measuring tip 21 under the influence of the workpiece are made to indicate the dimensions thereof as it and the gage assembly move relative to each other.

While the mechanism of the gage head 26 may be of any suitable construction, the head preferably is constructed in accordance with my Patent 2,627,119, issued February 3, 1953, and assigned to my present assignee. This construction (Figure 9) comprises an iron armature member 27 carried by spring members 28 so that it may move axially across the poles of an exciter coil 29 and a pair of pickup coils 30 and 31. The measuring tip 21 is carried by the armature member 27 and as the tip makes contact with the work, it shifts in position causing the iron armature to move across the pole pieces of the coils. This creates an unbalance in the flux fields of the exciter coil and one pickup coil with respect to the exciter coil and the other pickup coil. The difference in E. M. F. is transmitted by the pickup coils to an amplifier A (Fig. 8) as described in Patent 2,508,370, issued May 23, 1950, in the name of Michael Bozoian to my assignee. After amplification the amount of displacement of the tip is indicated on a meter 37 of the amplifier unless a permanent record is desired in which case a recorder R is also provided. The recorder is preferably pen driven and of conventional construction; it is connected to the output of the amplifier to drive the pen across a tape 41 which is advanced by an electric motor. The recorder motor and the motor which moves the workpiece across the gage head are connected together by suitable wiring so that both are started and stopped simultaneously. Thus the movement of the measuring tip as it and the workpiece are moved relative to each other during the gaging operation causes the recorder pen to draw an amplified but truly proportional profile of the surface of the workpiece that is being gaged. This gives a reading of dimension in accordance with the calibration of the lines on the tape 41 which may be preserved permanently.

In use, a master corresponding as accurately as possible to the dimensions desired in the workpieces to be measured is positioned on the rails 12 between the anvil 20 and the gaging tip 21. The gage head 26 is then adjusted vertically in the manner described below on the vertical leg 25 (Figure 3) until the meter 37 and the recorder pen indicate zero. After the position of the gage head has thus been properly adjusted, workpieces to be measured are placed successively on the rails 12 and moved through the gaging zone between the anvil 20 and the gaging tip 21 by the pusher 15. The meter 37 indicates the deviations, if any, of the workpiece from the predetermined standard and the pen of the recorder draws a line on the moving tape 41 making a permanent record throughout the length of the workpiece of these deviations of the workpiece from the predetermined standard as set by the master.

In order to provide for rigid yet adjustable support of the gage head 26 with respect to the anvil 20, the L-shaped sub-frame member 24 is preferably made of fairly heavy construction and with the horizontal leg 23 and the vertical leg 25 as integral parts thereof. As indicated in Figures 2 and 3, the horizontal leg 23 has secured to it a pair of clamping jaws 43 and 44 between which the anvil 20 is firmly clamped by screws 45. The anvil, which may be a rod composed of tungsten carbide or other hard wear resisting material, is thus held firmly in place.

Adjustment of the gage head 26 with respect to the anvil is provided for by securing its base against a suitable finished surface 48 in a shallow channel of the vertical leg 25. This is accomplished by means of a clamping screw 49 threadedly secured in the base of the head and received in a slot 50 of the vertical leg 25. When the clamping screw 49 is released by means of the hand grip 51, the entire gage head may be moved up and down on the vertical leg 25. This movement provides for coarse adjustment of the gage head. Such adjustment is carried out by placing the master gage on the rails 12 in contact with the anvil 20 and moving the gage head to such a position that the gaging tip 21 contacts the master gage and brings the needle of the meter 37 onto the meter scale. Hand grip 51 is then tightened. Thereafter the position of the gage head 26 is further and more accurately adjusted with respect to the master gage by means of the fine adjustment knob 52 which operates a differential screw mechanism such as shown in my Patent 2,627,119, aforesaid. The needle of the meter 37 is thus set at the zero position by means of the fine adjustment knob 52; such adjustment will also bring the pen of the recorder R to zero position. Thereafter as workpieces are measured, the needle will indicate zero if they are the same size as the master or above or below zero on the scale if they are larger or smaller. Since the scale is calibrated, the amount the needle is off zero will give a definite measurement of dimension. As stated above, the workpieces are supported on rails 12 while the gaging assembly of anvil and gage head on the sub-frame 24 is mounted so that it can float slightly with respect to the main frame and the rails 12.

In order to provide a frictionless and accurate floating support for the gaging assembly, a saddle member 55 (Figures 1 and 3) in the form of an inverted U is secured to the sub-frame 24 by screws 56, the inner base of the U overlying hte upper end of the vertical leg 25 of the sub-frame 24. Short, flat leaf springs in the form of mounting members 57 are secured to the ends of the legs 58 of the U-shaped saddle member 55 and extend vertically downwardly therefrom as shown particularly in Figures 1 and 3. The downwardly projecting ends of the flat spring members 57 are clamped securely to supporting posts 59 which are disposed on either side of the table 11. The springs are so secured to the saddle 55 and posts 59 that there is substantial clearance between the saddle and posts permitting them to rock with respect to each other, thus allowing the gaging assembly also to rock with respect to the table and ways 12. The springs are held in position by clamping rings 61 and 62 and screws 63 and 64 (Figure 3) engaging the U-shaped member and the supporting post, respectively. By this means, the gaging assembly consisting of sub-frame 24 and its associated gaging mechanisms are accurately held in position and permitted to float about the pivot provided by the springs 57. The floating movement is frictionless and entirely free from lost motion. This spring connection is also free from wear such as occurs in time with a pivoted connection.

In order to provide for adjustment of the position of the sub-frame gaging assembly with respect to the table in horizontal directions, the supporting posts 59 are secured to the table 11 by screws 66 extending through slots 67 in the table, the slots being elongated and of greater width than the diameter of the screws so that the posts can be adjusted with respect to the table to bring the gaging assembly to various desired positions. The posts are clamped in position by engagement of the heads 68 of the screws with washers 69 which in turn bear against the under surface of the table 11.

In order to make accurate measurements the pressure exerted by the anvil 20 on the work must be kept within a predetermined range which depends upon the nature of the gaging operation and the material being gaged. To provide for adjustment of this pressure and thus to make it possible to insure that the anvil will engage the work with sufficient pressure but not with such great pressure that the accuracy of the measurement will be impaired, a counterbalance 71 is provided. The counterbalance is threaded on a stud 72 which projects forwardly from a bracket 73 (Figures 2 and 3) that is permanently fixed to the vertical leg 25 of the sub-frame 24. The desired pressure can be obtained readily by adjusting the counterbalance 71 back and forth on the threaded stud 72. A lock nut 74 holds the counterbalance in adjusted position.

As indicated above, mechanism is provided automatically to advance the pusher 15 from the left to the right (Figure 2) and thereby move a workpiece along the rails 12 between the anvil 20 and the measuring tip 21. The drive mechanism then is automatically reversed, causing the pusher 15 to be moved back to the left-hand side, as shown in Figure 2. The construction is such that the pusher moves at one rate of speed during the gaging operation and is returned at a higher rate of speed to reduce the time required for a complete gaging cycle. The construction of this drive mechanism is best shown in Figures 1, 2 and 4.

An electric drive motor of conventional type is mounted within a case 80 secured to one end member 10, and through a shaft 82 drives a worm 84 and worm pinion 85. The worm pinion in turn drives two sets of spur gearing and through the gearing two threaded shafts 90 and 91 in opposite directions. The two sets of spur gearing comprise a pinion shaft 180 (Figures 1 and 2) journaled in frame bracket 181 rotatably to carry pinions 182 and 183 on opposite ends. Pinion 182 drivingly engages reduction idler pinion 184 which is rotatably carried on frame bracket-journaled stub shaft 185. Idler pinion 184 drivingly engages shaft gear 186 which is secured to and rotates threaded shaft 90 in a clockwise direction. Pinion 183 of considerably larger diameter than pinion 182 directly drives drive shaft gear 187 which is secured to and rotates threaded shaft 91 in a counterclockwise direction at a faster rotational speed than that of shaft 90. Gear 187 is of considerably less diameter than gear 184 and shaft 90 rotates slower than shaft 91 due to its driving reduction gear train consisting of pinions 182, 184 and gear 186 and the difference in diameters between the shaft gears 186 and 187 as is evident from an inspection of Figures 1 and 2. The two shafts are driven simultaneously and as hereafter described, connection may be made with either one to drive the head carrying the pusher 15 either to the right or left as shown in Figure 1. Lower shaft 90 drives the pusher to the right through the gaging cycle and upper shaft 91 to the left through the return cycle. At one end the shafts are journaled in the end member 10 that carries the gearing and at the other in journals 92 secured by screws 94 to the underside of the table 11.

The pusher 15 and bracket 16 are secured to a head 100 slidingly carried on a cylindrical bar 102 mounted in brackets 104 at each end 10 of the frame. The amount which the head can rock about the bar 102 is limited by the respective widths of the slot 105 (Figure 4) and of the bracket 16 which slides in it back and forth along the table. The bracket 16 is provided with a tongue 106 and at this point is secured to the head 100 by screws 107.

To drive head 100 back and forth along the bar 102 a clutch mechanism best shown in Figure 4 is provided. As indicated above and shown in the drawings, the shafts 90 and 91 are threaded along a substantial part of their length. They are threaded with their screw leads opposite each other and so arranged that a threaded member engaging lower shaft 90 will be urged toward the right (Figure 1) and the same member engaging shaft 91 will be urged toward the left as the two shafts are rotated.

A threaded member of this type is provided in clutch segment 110 which on its upper portion has a partial thread 112 formed to engage the threaded portion of shaft 91 and on its underside a partial thread 113 formed to engage the threaded portion of shaft 90. The segment 110 is mounted on head 100 to impart a driving force to it from either shaft 90 or 91 and the mounting is such that the segment 110 may be rocked to engage these shafts alternately.

This mounting includes a rod 115 to which the segment is secured, the outer end 116 of the rod acting as a lever to permit the operator manually to flip the segment 110 from one shaft to the other. The inner end of the rod is secured at 117 to a T-shaped arm with a downwardly extending leg 120 and horizontal legs 122 (the latter being shown in dotted lines in Figure 2). At the ends of these horizontal legs are cone-shaped holes adapted to receive suitable cone headed pins 123 (Figure 1) carried by members secured to the head 100. This pivoted mounting serves to transmit the drive from either shaft to the head 100 causing it and the pusher to move back and forth along rod 102 parallel to the ways 12.

To hold the segment 110 against either shaft desired, a spring loaded toggle is provided (Figure 4). This comprises a finger 125 pivotally connected to the lower end of arm 120 and supported by a short stiff spring 126 at 127 which is a pivot point for the toggle. The spring in turn is secured by screws 128 to a member 129 fastened by screws 130 to the underside of head 100. It will be seen that member 129 has a central opening 131 to provide room for the arm 120 and finger 125. When the segment 110 is shifted from engagement with one shaft to engage the other, spring 126 allows the toggle to straighten about the pivot of the cone-headed pins on one end and the pivot 127 at the other end and also acts later to hold segment 110 in the desired driving engagement. The segment may be shifted manually by the lever 116 to start or reverse the travel of pusher 15, or this may be accomplished automatically.

The mechanism for automatically operating the pusher 15 is best shown in Figures 1, 3, 5 and 6. The operation of the pusher 15 is initiated by moving the lever 116 down, rocking it about pivot 123, so that segment 110 engages rotating shaft 90, the shaft turning in a clockwise direction when viewed, as in Figures 3 and 5. The rotation of the shaft 90 causes its threads, which are in engagement with the partial thread on segment 110, to push the head 100 and pusher 15 toward the right, as shown in Figure 1. The toggle formed by the arm 120 and finger 125 holds the segment threads in engagement with the threads on the shaft 90. Motion of the pusher continues along the ways 12 until the gaging of the workpiece is completed. At this time the head 100 has moved into proximity to a pin 135 (Figure 1) on the shaft 90. Alternatively, if desired, this pin may be mounted on a collar on the shaft so that its position with respect to the end thereof is adjustable.

As the head 100 approaches the pin 135, a pivotally mounted arm 137 moves into the path of rotation of the pin 135. This arm is pivoted at screw connection 138 to a depending portion 140 of member 129 which in turn is secured to head 100. At this time the rotating pin strikes the side of arm 137 and pushes it counterclockwise about its pivot 138, as shown in Figure 5. This likewise moves a finger 142, which is secured to the arm 137 by screw 144, in the same direction. The result is that the inturned end 145 of the finger 142 makes contact with an arm 150 carried by the toggle arm 120 and pulls it to the right (Figure 5). The arm 150 is L-shaped with a leg of the L extending downwardly as shown in Figure 6. An upper horizontal leg 152 of the L (Figure 7) has a central opening to enable it to be passed along arm 120 to a desired position (Figure 4)

and there locked in position by set screw 155. Thus motion of the arm 150, due to shaft pin 135, is transmitted to toggle arm 120, rocking rod 115, and shifting segment 110 out of engagement with shaft 90 and into engagement with shaft 91. The direction of travel of pusher 15 is thus reversed and it is returned to its original starting position.

When the head and pusher have reached this original position a normally closed micro-switch 160 is actuated to stop the drive motor in the case 80. To this end a switch 160 with a roller contact 162 is mounted on a base 164. The base is mounted on a square guide bar 165 and may be locked in any desired position along it by screw 167. This adjustment in position of the micro-switch makes it possible to vary the place at which the pusher stops on its return movement. The arm 150 is formed at its end as shown at 170 (Figures 1 and 3) to engage roller contact 162 and actuate the switch 160, stopping the motor.

Figure 10:
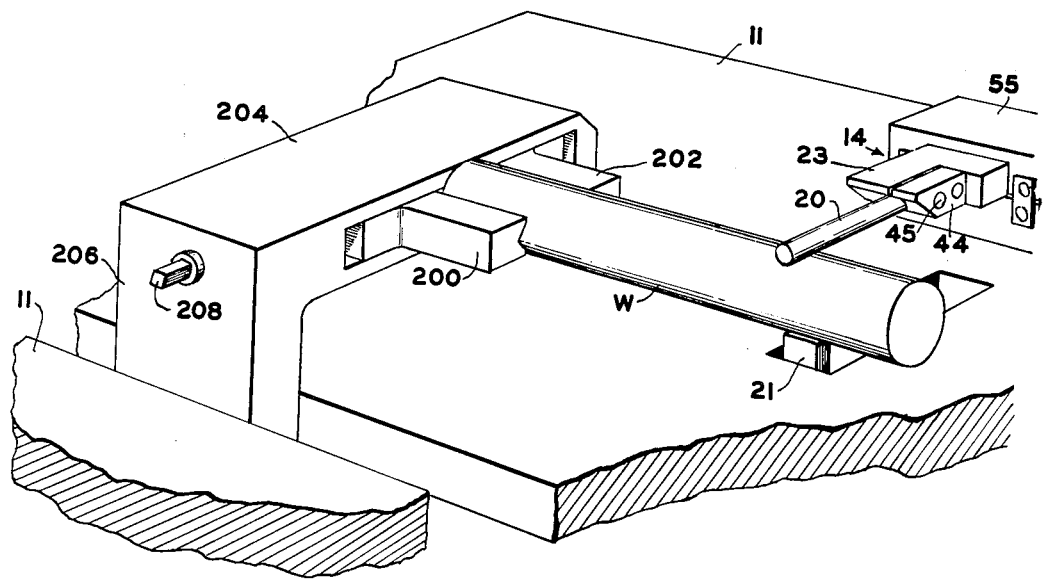
Figure 10 is a fragmentary perspective view of another embodiment of the invention.

When the next gaging cycle is to be started the hand lever 116 is pushed down to engage segment 110 with lower shaft 90. This also causes the end 170 of the arm 150 to be rocked normal to the axis of shafts 90 and 91 away from roller 150 of the micro-switch. The switch 160 is thus allowed to close and the motor to start in rotation to drive the pusher 15 through another gaging cycle. As heretofore explained, the motor which drives the pusher and the motor which drives the recorder are started and stopped simultaneously. Thus when the lever 116 is shifted to release the micro-switch 160 the recorder tape 41 begins to move. Of course if the particular gaging operation does not require a recorder, this will not occur as the recorder will be disconnected. In the embodiment of the device shown in Figure 10, the supporting rails 12 are dispensed with, and the workpiece W is securely held in the universal jaws 200 and 202 of a chuck member 204 secured to a vertical pusher member 206. The jaws are adjustable by screw means indicated at 208. In all other respects the gaging operation proceeds in the same manner as described hereinabove, with the sole exception that the workpiece W is supported in the chuck jaws 200 and 202 rather than on the support guide rails 12.

From the foregoing description it will be seen that I have provided a novel mechanism for gaging workpieces in the manner indicated. It will be understood that various modifications may be made in the construction disclosed without departing from the spirit of the invention. Further, various other forms of gaging devices than that illustrated by head 26 may be used to be actuated by the measuring tip 21 as it engages a workpiece.

I claim:

1. Gaging mechanism comprising a frame, a gage head carried by said frame, traversing means movably carried by said frame to engage a movably supported workpiece for unidirectional movement therewith, means to move said gage head and said means relative to each other and means to maintain said gage head in gaging relation with a surface of said workpiece to gage said surface continuously during said unidirectional movement.

2. Mechanism according to claim 1 in which said gage head is floatingly mounted on said frame for automatically compensating movement in a plane transversely of the path of relative movement between said gage head and said workpiece engaging means.

3. Mechanism according to claim 1 including means to traverse said workpiece engaging means relative to said frame at one speed to gage a surface on the workpiece and thereafter at another speed to return to its initial position.

4. Gaging mechanism comprising a main frame, a sub-frame shiftably mounted on said main frame, a gaging device with a work engaging tip carried by said sub-frame, an anvil member carried by said sub-frame and adapted to cooperate with said tip to gage a workpiece therebetween, non-rotatable support means on said main frame to move a workpiece between said anvil and tip for gaging the same and a mount for said sub-frame on said main frame including a resilient connection permitting said sub-frame limited floating movement with respect to said main frame.

5. Mechanism according to claim 4 including means to adjust the anvil and tip relative to each other to vary the space between them.

6. Mechanism according to claim 4 in which said sub-frame and said support means are bodily shiftable with respect to each other to gage a workpiece between said anvil and tip as it is moved with respect thereto.

7. Automatic gaging apparatus comprising a main frame, a gage assembly including a sub-frame shiftably mounted on said main frame, an anvil and a gaging device embodying a gaging tip supported on said sub-frame and adapted to engage a surface of said workpiece, mechanism adapted to engage a workpiece carried by said main frame and move said workpiece between said anvil and tip to gage said workpiece, means for driving said mechanism, a reversing device adapted automatically to reverse the direction of movement of said mechanism after a workpiece has moved past said tip and been gaged and a micro-switch and a switch engaging element, one carried by said main frame and the other by said mechanism and so arranged that said element and said switch engage to stop said driving means when said mechanism returns to its starting position.

8. Automatic gaging apparatus comprising a supporting frame, a gage assembly including a sub-frame shiftably mounted on said supporting frame, said sub-frame having a horizontal leg and a vertical leg, an anvil mounted on one leg and adapted to engage a workpiece carried by said supporting frame, a gaging device embodying a gaging tip supported on said other leg and adapted to engage a surface of said workpiece, workpiece non-rotatable support means on said supporting frame, mechanism adapted to engage said workpiece carried by said means and move said workpiece between said anvil and tip to gage said workpiece, and a mount for said sub-frame on said supporting frame including a resilient connection permitting said sub-frame limited floating movement with respect to said main frame.

9. Automatic gaging apparatus comprising a supporting frame, a gage assembly including a sub-frame shiftably mounted on said supporting frame, said sub-frame having a horizontal leg and a vertical leg, an anvil mounted on one leg and adapted to engage a workpiece carried by said supporting frame, a gaging device embodying a gaging tip supported on said other leg and adapted to engage a surface of said workpiece, mechanism adapted to engage a workpiece carried by said supporting frame and move said workpiece between said anvil and tip to gage said workpiece, means for driving said mechanism comprising a pair of threaded screws carried by said frame, a threaded member carried by said mechanism, said threaded member having one portion adapted to engage one of said screws and another portion adapted to engage the other of said screws, a motor for driving said screws, shiftable means for moving said threaded member into engagement with one screw for advancing said mechanism to move a workpiece between said tip and said anvil, a reversing device adapted automatically to move said threaded member out of engagement with said advancing screw and into engagement with said retracting screw to reverse the direction of movement of said mechanism, a normally closed microswitch and a switch engaging element, one carried by said main frame and the other by said mechanism and so arranged that said element and said switch engage to stop said motor when said mechanism returns to its starting position.

10. Automatic gaging apparatus comprising a supporting frame, a pair of parallel rails mounted on said frame and adapted to support an elongated workpiece to be gaged, a gaging assembly comprising a sub-frame pivotally mounted on said supporting frame, an anvil mounted on said sub-frame and adapted to engage an upper surface of a workpiece supported on said rails, a gage head adjustably supported on said sub-frame for movement toward and away from said anvil, said gage head embodying an electrical pickup and a gaging tip projecting upwardly therefrom, said gaging tip being disposed between said rails and being adapted to engage a lower surface of said workpiece, movements of said gaging tip controlling the output of said pickup and means for amplifying and indicating the output of said pickup.

11. Automatic gaging apparatus comprising a supporting frame, a pair of parallel rails mounted on said frame and adapted to support a workpiece to be gaged, a gaging assembly comprising a sub-frame pivotally mounted on said supporting frame, an anvil mounted on said sub-frame and adapted to engage a surface of a workpiece supported on said rails, a gage head supported on said sub-frame, said gage head embodying an electrical pickup and a gaging tip projecting therefrom, said gaging tip being adapted to engage a surface of said workpiece opposed to said first surface, movements of said gaging tip controlling the output of said pickup, means for amplifying the output of said pickup, a recorder to record the output of said pickup on a moving chart, and means for progressing a workpiece along said rails and in contact with said pickup and said anvil at a substantially uniform speed.

12. Automatic gaging apparatus comprising a supporting frame, a pair of parallel rails mounted on said frame and adapted to support an elongated workpiece to be gaged, a gaging assembly comprising a sub-frame pivotally mounted on said supporting frame, an anvil mounted on said sub-frame and adapted to engage an upper surface of a workpiece supported on said rails, a gage head adjustably supported on said sub-frame for movement toward and away from said anvil, said gage head embodying an electrical pickup and a gaging tip projecting upwardly therefrom, said gaging tip being disposed between said rails and being adapted to engage a lower surface of said workpiece, movements of said gaging tip controlling the output of said pickup, means for amplifying the output of said pickup, a recorder to record the output of said pickup on a moving chart, and means for progressing a workpiece along said rails and in contact with said pickup and said anvil at a substantially uniform speed whereby said chart gives an amplified indication of the profile of said workpiece throughout the length thereof.

13. Automatic gaging apparatus comprising a supporting frame, a pair of spaced parallel rails mounted on said frame and adapted to support an elongated workpiece to be gaged, a gage assembly comprising an inverted L-shaped sub-frame pivotally mounted on said supporting frame, said sub-frame having a horizontal leg and a vertical leg, an anvil mounted on the underside of said horizontal leg and adapted to engage an upper surface of a workpiece supported on said rails, a gage head adjustably supported on said vertical leg for movement toward and away from said anvil, said gage head embodying an electrical pickup and a gaging tip projecting upwardly therefrom, said gaging tip being disposed between said rails and being adapted to engage a lower surface of said workpiece, movements of said gaging tip controlling the output of said pickup and means for amplifying and indicating the output of said pickup, and a pusher disposed above said rails and adapted to engage a workpiece and move said workpiece along said rails, pusher support means slidably secured to said frame, means for driving said pusher comprising a pair of oppositely rotating screws, a nut member disposed between said screws and mounted on the said pusher support means for said pusher, said nut member having one threaded portion adapted to engage one of said screws and another threaded portion adapted to engage the other of said screws one of said screws being a pusher advancing screw and the other of said screws being a pusher retracting screw, a toggle or snap action support for said nut member whereby said nut member is urged into engagement with either one or the other of said screws, an electric motor for alternatively driving said screws, a manually operable handle for moving said nut member into engagement with one of said screws, a dog mounted on one of said screws and adapted to engage said toggle mechanism to move said nut out of engagement with said advancing screw and into engagement with said retracting screw whereby said pusher is moved in the opposite direction, a cam carried by the support for said pusher and a normally closed microswitch having an operating finger disposed in the path of said cam at the opposite end of the travel of said pusher, said cam being adapted to engage the operating finger of said microswitch and open the same thereby stopping said motor.

References Cited in the file of this patent
UNITED STATES PATENTS

| | | |
|---|---|---|
| 1,448,057 | Denehie | Mar. 13, 1923 |
| 1,818,968 | Anderson | Aug. 18, 1931 |
| 2,190,306 | Balsiger | Feb. 13, 1940 |
| 2,305,816 | Sonneberger | Dec. 22, 1942 |
| 2,365,593 | Rights et al. | Dec. 19, 1944 |
| 2,563,254 | Lewis | Aug. 7, 1951 |
| 2,569,564 | Gulliet | Oct. 2, 1951 |
| 2,571,917 | Mennesson | Oct. 16, 1951 |
| 2,717,452 | Richardson et al. | Sept. 13, 1955 |